(12) United States Patent
Sen et al.

(10) Patent No.: US 10,394,958 B2
(45) Date of Patent: Aug. 27, 2019

(54) PERFORMING SEMANTIC ANALYSES OF USER-GENERATED TEXT CONTENT USING A LEXICON

(71) Applicant: CONDUENT BUSINESS SERVICES, LLC, Dallas, TX (US)

(72) Inventors: Anirban Sen, West Bengal (IN); Manjira Sinha, Karnataka (IN); Sandya Srivilliputtur Mannarswamy, Karnataka (IN); Shourya Roy, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 110 days.

(21) Appl. No.: 15/808,100

(22) Filed: Nov. 9, 2017

(65) Prior Publication Data
US 2019/0138599 A1    May 9, 2019

(51) Int. Cl.
*G06F 17/27* (2006.01)
*G06F 17/24* (2006.01)
*G10L 25/30* (2013.01)
*H04L 12/58* (2006.01)

(52) U.S. Cl.
CPC ........ *G06F 17/2785* (2013.01); *G06F 17/241* (2013.01); *G06F 17/274* (2013.01); *G06F 17/277* (2013.01); *G06F 17/2735* (2013.01); *G10L 25/30* (2013.01); *H04L 51/046* (2013.01)

(58) Field of Classification Search
CPC ..................................................... G06F 17/27
USPC ......... 707/802; 706/30, 20, 18, 12; 704/9, 8, 704/275, 260, 256; 702/189
See application file for complete search history.

(56) References Cited

U.S. PATENT DOCUMENTS

| | | | | |
|---|---|---|---|---|
| 5,544,280 A | * | 8/1996 | Liu | G06N 3/0675 706/18 |
| 5,761,386 A | * | 6/1998 | Lawrence | G06K 9/00523 706/20 |
| 6,728,691 B1 | * | 4/2004 | Neuneier | G06N 3/049 706/30 |
| 7,574,357 B1 | * | 8/2009 | Jorgensen | G10L 15/24 704/201 |
| 8,275,803 B2 | * | 9/2012 | Brown | G06F 17/28 707/802 |

(Continued)

OTHER PUBLICATIONS

Wu et al., "A Joint Prediction Model for Multiple Emotions Analysis in Sentences", A. Gelbukh (Ed.): CICLing 2013, Part II, LNCS 7817, 2013, 149-160.

(Continued)

*Primary Examiner* — Michael C Colucci
(74) *Attorney, Agent, or Firm* — Jones Robb, PLLC

(57) ABSTRACT

A method and system for performing semantic analysis for electronic communication using a lexicon is provided. A neural network model is trained with a plurality of annotated text strings, the annotations comprising characteristic tuples that indicate characteristics for the text strings. An unannotated text string is received that comprises a plurality of words from a user. A characteristic matrix for the received text string is generated using a lexicon. The determined characteristic matrix is input into the trained neural network. And a characteristic tuple that indicates a characteristic for the received text string is received as output from the trained neural network.

20 Claims, 7 Drawing Sheets

(56) References Cited

U.S. PATENT DOCUMENTS

| | | | | |
|---|---|---|---|---|
| 8,620,662 | B2* | 12/2013 | Bellegarda | G10L 13/06 704/260 |
| 8,660,849 | B2* | 2/2014 | Gruber | G10L 15/22 704/275 |
| 8,682,649 | B2* | 3/2014 | Bellegarda | G10L 13/10 704/10 |
| 8,719,006 | B2* | 5/2014 | Bellegarda | G10L 13/02 704/1 |
| 8,812,294 | B2* | 8/2014 | Kalb | G06F 17/2881 379/88.05 |
| 8,935,167 | B2* | 1/2015 | Bellegarda | G10L 15/063 704/231 |
| 10,115,393 | B1* | 10/2018 | Kumar | G10L 15/07 |
| 2006/0074604 | A1* | 4/2006 | Seger | G06N 3/02 702/189 |
| 2006/0122834 | A1* | 6/2006 | Bennett | G10L 15/1822 704/256 |
| 2013/0275346 | A1* | 10/2013 | Srikanteswara | H04W 76/10 706/12 |
| 2015/0161522 | A1* | 6/2015 | Saon | G06N 3/0454 706/12 |
| 2015/0310862 | A1* | 10/2015 | Dauphin | G10L 15/1815 704/257 |
| 2016/0155067 | A1* | 6/2016 | Dubnov | G06F 17/2785 706/12 |
| 2017/0053665 | A1* | 2/2017 | Quatieri, Jr. | G10L 25/27 |
| 2017/0270100 | A1* | 9/2017 | Audhkhasi | G06F 17/28 |
| 2018/0182376 | A1* | 6/2018 | Van Gysel | G10L 15/16 |
| 2018/0329512 | A1* | 11/2018 | Liao | G06F 3/01 |
| 2018/0329883 | A1* | 11/2018 | Leidner | G06F 17/2775 |

OTHER PUBLICATIONS

Picard, R.W., "Affective Computing", M.I.T Media Laboratory Perceptual Computing Section Technical Report No. 321, 1995, 16 pages.

Krcadinac et al., "Synesketch: An Open Source Library for Sentence-Based Emotion Recognition", 2013, 14 pages.

Canales et al., "Emotion Detection from text: A Survey", Proceedings of the Workshop on Natural Language Processing in the 5th Information Systems Research Working Days (JISIC 2014), Oct. 20-24, 2014, 43 pages.

Ma et al., "Emotion Estimation and Reasoning Based on Affective Textual Interaction", International Conference on Affective Computing and Intelligent Interaction ACII 2005: Affective Computing and Intelligent Interaction, Lecture Notes in Computer Science, vol. 3784, 2005, 7 pages.

Masum et al., "Emotion Sensitive News Agent: An Approach Towards User Centric Emotion Sensing from the News", 2007 IEEE/WIC/ACM International Conference on Web Intelligence, 2007, 614-620.

Workshop on Computational Approaches to Analysis and Generation of Emotion in Text, NAACL HLT 2010, Jun. 5, 2010, Los Angeles, California, 155 pages.

Viera et al., "Understanding Interobserver Agreement: The Kappa Statistic", Family Medicine, Research Series, vol. 37, No. 5, May 2005, 5 pages.

Chaumartin "UPAR7: A knowledge-based system for headline sentiment tagging", SemEval (ACL Workshop), 2007, Prague, Czech Republic, 2007, 422-425.

Strapparava et al., "Learning to Identify Emotions in Text", SAC'08 Mar. 1620, 2008, Fortaleza, Ceara, Brazil, 5 pages.

Neviarouskaya et al., "Recognition of Affect, Judgment, and Appreciation in Text", Proceedings of the 23rd International Conference on Computational Linguistics (Coling 2010), Beijing, China, Aug. 2010, pp. 806-814.

Munezero et al., "Are They Different? Affect, Feeling, Emotion, Sentiment, and Opinion Detection in Text", IEEE Transactions on Affective Computing, Manuscript ID, Apr. 2014, 12 pages.

Pang et al., "Thumbs up? Sentiment Classification using Machine Learning Techniques", Appears in Proc. 2002 Conf. on Empirical Methods in Natural Language Processing (EMNLP), May 28, 2002, 9 pages.

Ekman, "Universal Facial Expressions of Emotion", California Mental Health Research Digest, vol. 8, Autumn, 1970, No. 4, 151-158.

Agrawal et al., "Unsupervised Emotion Detection from Text using Semantic and Syntactic Relations", Web Intelligence and Intelligent Agent Technology (WI-IAT), 2012 IEEE/WIC/ACM International Conferences on, Dec. 4-7, 2012, 8 pages.

\* cited by examiner

PERFORMING SEMANTIC ANALYSES OF USER-GENERATED TEXT CONTENT USING A LEXICON

FIELD

The presently disclosed embodiments are generally related to linguistics. More particularly, the present embodiments relate to systems and methods for performing semantic analyses of user-generated content using a lexicon.

TECHNICAL BACKGROUND

Electronic communication has become a pervasive means of communicating between individuals at remote locations. Email services, short message service (SMS) messaging, chat applications, social media applications, and numerous other services have revolutionized that way individuals and organizations can communicate with each other and one another. However, the rise of electronic communication has also generated new paradigms in conversation. For example, communication over an email, SMS, or chat applications is far different from in-person communication or even telephone conversations. Indeed, a transcribed telephone conversation or in-person conversation would look far different from an email, SMS, or chat transcription about the same topic or subject matter. The subtleties of person to person interactions, such as tone, emotional queues, and reactions to other's communication, are expressed differently in electronic communication.

In some instances, these subtleties are expressed differently among electronic communication itself. For example, an email may be drafted with a level of formality that a chat message or SMS message lacks, and thus the manner in which tone or emotional queues are communicated may be different. The ability to understand and identify emotional queues or reactions within electronic communication has become both immensely important for many business, such as service industries or the service component to a business selling a product, and a vexing issue to solve. For example, current customer service divisions may be dependent on individuals to detect a customer's emotions or reaction, such as dissatisfaction at the experience or anger at the product or service that the interaction relates to, and thus the quality of the customer service may vary greatly based on the individual providing the service. In other examples, marketing divisions that are better able to detect excitement over a product or service in electronic communication will have more success converting potential customers into realized customers.

Thus, there is a need to improve the detection techniques for an individual's reactions or emotions in electronic communication. In particular, an increase in the reliability of such detection can improve the consistency for services offered, such as customer service services or marketing services. One technique for realizing such an improvement relies on a technological improvement in the way such electronic communication is analyzed.

For example, artificial intelligence techniques have helped industries leverage computing systems to make various improvements, from quality control to cost efficiency. However, artificial intelligence systems can have varying degrees of success. A computing system's ability to learn is highly dependent on the circumstances presented to it. In other words, artificial intelligence systems' rely on well-tailored technological solutions to provide quality service.

When considering an artificial intelligence system's ability to reliably predict emotion or reactions in electronic communication, a number of potential solutions are available. Thus, the application of the technology plays a pivotal role in the effectiveness of any solution. Bulky or overly complex solutions may pose a number of problems when these solutions are paired with artificial intelligence systems, as the complexity may introduce problems that in turn fail to ensure reliable and accurate results. There exists a need to provide simplistic yet effective solutions that leverage artificial intelligence systems to provide reliable and accurate prediction of emotion or reaction in electronic communication.

SUMMARY

In an exemplary embodiment, a method and system for performing semantic analysis for electronic communication using a lexicon is provided. A neural network model is trained with a plurality of annotated text strings, the annotations comprising characteristic tuples that indicate characteristics for the text strings. An unannotated text string is received that comprises a plurality of words from a user. A characteristic matrix for the received text string is generated using a lexicon. The determined characteristic matrix is input into the trained neural network. And a characteristic tuple that indicates a characteristic for the received text string is received as output from the trained neural network.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure, as claimed.

The accompanying drawings, which are incorporated in and constitute a part of this specification, illustrate embodiments of the present disclosure and together with the description, serve to explain the principles of the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

References to "one embodiment," "at least one embodiment," "an embodiment," "one example," "an example," "for example," and so forth are used to indicate that embodiment(s) or example(s) may include a particular feature, structure, characteristic, property, element, and/or limitation. But, not every embodiment or example necessarily includes that particular feature, structure, characteristic, property, element, and/or limitation. Furthermore, repeated use of the phrase "in an embodiment" does not necessarily refer to the same embodiment.

Figure 1:
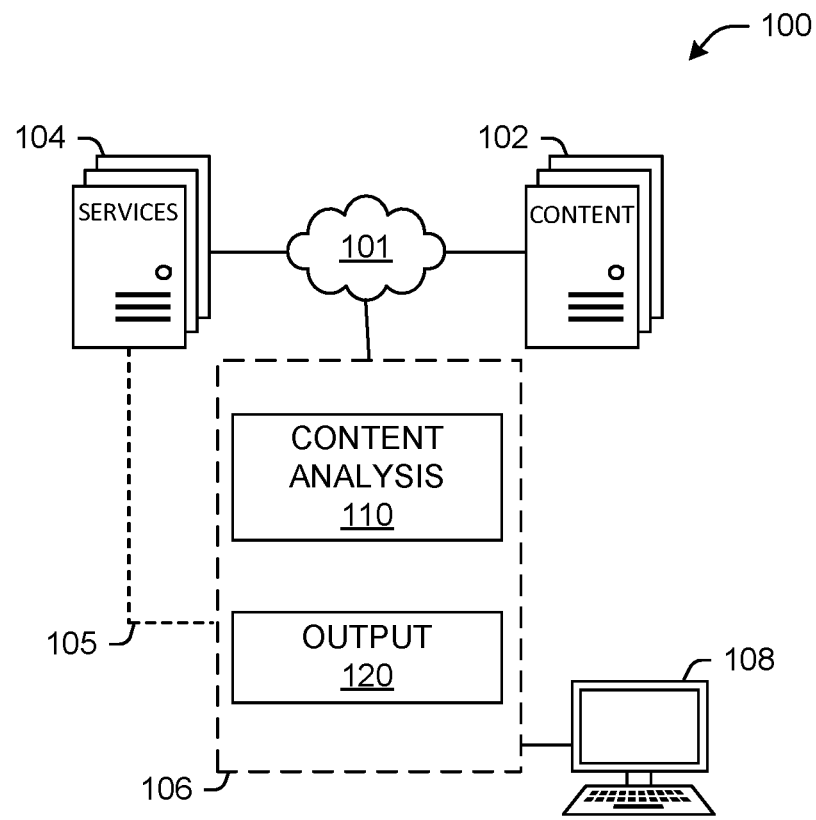
FIG. 1 shows an exemplary system for performing semantic analysis using a lexicon for electronic communication.

FIG. 1 shows an exemplary system 100 for performing semantic analysis of electronic communication. System 100 comprises a network 101, one or more content servers 102, one or more service provider servers 104, and a processing node 106 communicatively coupled to network 101 and a user terminal 108. The various components of system 100 may be interconnected with each other over network 101. For example, processing node 106 can communicate with content server 102 and/or the one or more service provider servers 104 over network 101. Further, processing node 106 may be in direct communication with the one or more service provider servers 104 via a communication link 105. A person having ordinary skill in the art would understand that the embodiments disclosed herein may also be implemented using different configurations comprising multiple processing nodes, distributed terminals, and combinations of networks, without departing from the scope of the disclosure. Further, a person having ordinary skill in the art would understand that processing node 106, as well as each of content servers 102 and service provider servers 104 include a processor and a memory, with the memory storing computer-readable logic, or logical modules, that are executed by the processor to perform the various operations described herein. A person having ordinary skill in the art would understand that one or more of content servers 102, service provider servers 104, processing node 106, and user terminal 108 can comprise a single computing device or node without departing from the scope of the disclosure.

For example, processing node 106 is configured to store and execute a content analysis module 110 and an output module 120. These modules comprise logical instructions that enable processing node 106 to perform semantic analyses of user-generated content, as further described herein. For example, content analysis module 110 may be executed to obtain electronic communication from the one or more content servers 102 and analyze such content. The one or more content servers 102 may comprise any combination of online social networks, social media platforms, websites such as Facebook, Twitter, and the like, online blogs, web forums, and the like, applications such as email applications, SMS applications, chat application, and other messaging applications.

In an exemplary embodiment, an organization may have a proprietary or otherwise internal chat application, for example an application for employees to talk amongst each other or for employees, such as customer service representatives or marketing representatives, to communicate with outside individuals, such as customers or potential customers. The electronic communication sourced from content servers 102 can include one or more text strings. In some embodiments, content servers 102 may store electronic communication comprising text strings, such as chat data, emails, or messaging data, between individuals, such as an employee of an organization and a customer, and the electronic communication may be obtained by content analysis module 110 for analysis.

Content analysis module 110 may further obtain electronic communication from the one or more service provider servers 104. For example, service provider servers 104 can include a chat applications, email applications, or other messaging applications, wherein the electronic communication comprises chat data, messaging data, or emails between individuals. As further described herein, an initial set or corpus of text strings sourced from user-generated content may be utilized to train neural network models, such as word and document vector models, as further performed by content analysis module 110.

Content analysis module 110 is configured to perform semantic analyses on the electronic communication to determine reactions or emotions within the electronic communication by the individuals in communication. As further described herein and with reference to FIGS. 4-6, performing semantic analysis on the electronic communication includes training a neural network model with a plurality of annotated text strings, generating a vector matrix for turn based electronic communication, and determining a characteristic tuple for the turn based electronic communication. Output module 120 can output the generated output, for example the characteristic tuple, or can further output a result for the turn based electronic communication.

Figure 2:
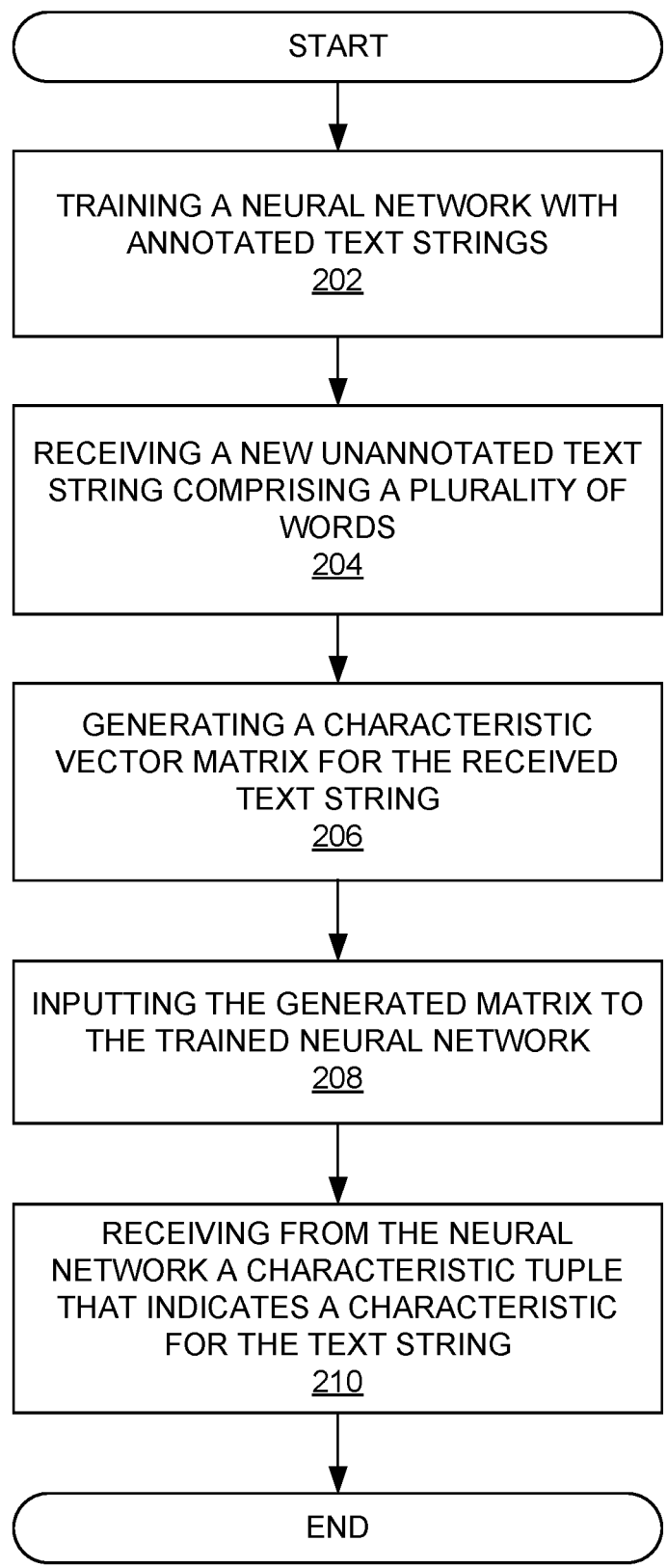
FIG. 2 shows an exemplary method for performing semantic analysis using a lexicon for electronic communication.

FIG. 2 shows an exemplary method for performing semantic analysis of electronic communication using a lexicon. The method of FIG. 2 is described with respect to FIG. 1, how any other suitable system configuration can be implemented. For example, the method can be implemented with any suitable processing node/module. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 202, a neural network model may be trained with a plurality of annotated text strings, the annotations comprising characteristic tuples that indicate characteristics for the text strings. For example, a neural network model, such as a 3-level neural network with a hidden layer, or any other suitable neural network, may be trained with a plurality of annotated text strings. The annotated text strings may comprise electronic communication, such as chat data, that comprise annotations related to emotion values across a plurality of emotion categories for the associated text string. For example, the annotations for a given text string may be a characteristic matrix, as further described herein, that comprises a plurality of characteristic tuples, as further described herein, for a plurality of words within the associated given text string. In an exemplary embodiment, the neural network model may be trained to receive an input of a characteristic matrix associated with an unannotated text string and output a characteristic tuple that indicates emotion values for the unannotated text string in a plurality of emotion categories.

At 204, an unannotated text string may be received comprising a plurality of words from a user. For example, an unannotated text string comprising an electronic communication, such as an message comprising a plurality of words from a turn based chat application, may be received from a user. In various examples, the unannotated text string may comprise complete sentences, sentence fragments, and any other suitable language commonly used when communicating using a turn based chat application.

At 206, a characteristic matrix may be generated for the received text string using a lexicon. For example, a characteristic matrix may be generated for the electronic communication (e.g., turn based message of a chat application). The characteristic matrix may be generated using a lexicon, such as an emotion representative dictionary. The lexicon, such as an emotion representative dictionary, will be further described with reference to FIG. 4. The generation of a turn based characteristic matrix will be further discussed with reference to FIG. 5.

At 208, the determined characteristic matrix may be input into the trained neural network. For example, the characteristic matrix (e.g., for a chat message from a user associated with a turn of a chat application) may be generated using a lexicon and subsequently input in the trained neural network. At 210, a characteristic tuple that indicates a characteristic for the received text string may be received as output from the trained neural network. For example, the trained neural network may receive as input the characteristic matrix that is associated with the received text string (e.g., chat message) and output a characteristic tuple for the received text string (e.g., chat message) that indicates values for emotion categories for the received string.

Figure 3:
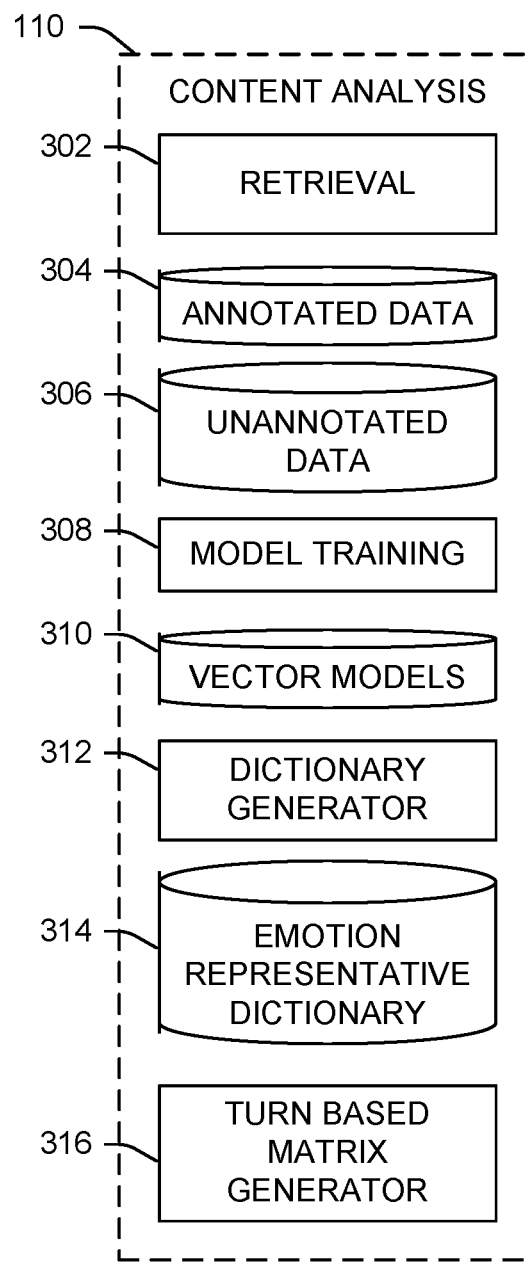
FIG. 3 shows an exemplary content analysis module for performing semantic analysis using a lexicon for electronic communication.

FIG. 3 shows an exemplary content analysis module 110 for performing semantic analysis of electronic communication using a lexicon. A person having ordinary skill in the art would understand that content analysis module 110, as well as each of retrieval module 302, annotated data 304, unannotated data 306, model training module 308, vector models 310, dictionary generator module 312, emotion representative dictionary 314, and turn based matrix generator module 316 may comprise a combination of computer-readable logic instructions stored on a memory, and executable by a processor to perform the various operations described herein.

In exemplary embodiments, retrieval module 302 is used to obtain electronic communication, such as emails, messages, or chat data, from one or more sources. For example, such electronic communication may be obtained from social media websites, as detailed herein, from native or web applications, such as email applications or chat applications, and the like. For example, native or web messaging applications (e.g., hosted by one or more of service provider servers 104 and/or content servers 102) may be configured to communicate with retrieval module 302 such that turn based chat data is obtained by the retrieval module. The turn based chat data may comprise a text string that meets a size criteria (e.g., 196 words, or any other suitable criteria). Retrieval module 302 may be configured to retrieve chat data from the messaging application at each turn of the chat (e.g., upon entry of each chat message by a user of the chat application).

In other exemplary embodiments, retrieval module 302 may be used to obtain user-generated content that is hosted across a network, such as the Internet, at various sources, such as web and social media sites. For example, in-order to crawl data from Facebook®, Twitter®, and various web portals, retrieval module 302 can include a Graph® API, representational state transfer (REST) or RESTful API, and other web services for providing interoperability between computer systems on the Internet such as HTML/XML parsers are used respectively. Such REST-compliant online services allow requesting systems such as content analysis module 110 to access and manipulate textual representations of Web resources using a uniform and predefined set of stateless operations. The Rest APIs (written in JavaScript) may be used to store the user-generated content, such as in a MySql® database. Other forms of web services exist, which expose their own arbitrary sets of operations such as WSDL and SOAP, and retrieval module 302 may be configured to obtain content using these web services in other embodiments. The user-generated content obtained from such web or social media sites may also comprise electronic communication in the form of text strings that meet a size criteria.

Content analysis module 110 also comprises a plurality of data stores that store annotated data 304 and unannotated data 306. In exemplary embodiments, annotated data 304 may comprise electronic communications comprising text strings that have been annotated, for instance to train a neural network. Unannotated data 306 may comprise similar electronic communications to annotated data 304, however no annotations are associated with the electronic communications. In exemplary embodiments, annotated data 304 may comprise chat data, such as text strings that represent turns in a chat (e.g., entries of a message by a chat user), where the annotations for a given text string may comprise a characteristic matrix that indicates emotion values across a plurality of emotion categories for a subset of words in the text string. In some examples, the annotations may also comprise a characteristic tuple that indicates emotion values for the entire associated text string across a plurality of emotion categories. In exemplary embodiments, unannotated data 306 may comprise raw chat data, such as text strings that represent turns in a chat without additional annotation. In some embodiments, annotated data 304 may comprise substantially fewer annotated chat text strings than the number of raw chat text strings comprising unannotated data 306. Annotated data 304 and unannotated data 306 may comprise electronic communications obtained by retrieval module 302, or electronic communications stored by any other suitable means.

Content analysis module 110 comprises a plurality of modules configured to analyze electronic communications, such as turn based chat data. Content analysis module 110 comprises model training module 308, dictionary generator module 312, and turn based matrix generator 316, along with stored vector models 310 and stored emotion representative dictionary 314.

Vector models 310 comprise at least word vector models. In exemplary embodiments, model training module 308 uses annotated data 304 and unannotated data 306 as an input corpus of text. The words within the input corpus may be represented using the model Word2vec, which is a tool for projecting words into a vector space. Word2vec is a group of related models that are used to produce word embeddings. These models may be shallow, two-layer neural networks that are trained to reconstruct linguistic contexts of words. Word2vec takes as its input a large corpus of text (the annotated data 304 and unannotated data 306) and produces a vector space, typically of several hundred dimensions, with each unique word in the corpus being assigned a corresponding vector in the space. Word vectors are positioned in the vector space such that words that share common contexts in the corpus are located in close proximity to one another in the space. The disclosed operations include projecting the words in the same dimension, resulting in a first distributed representation of words, and then computing the distance, such as cosine distance or inner product similarity, between words to determine similarities. Distributed representations of words can be thought of as word vectors, where each word is represented as a vector and each element is the value of different vector dimensions for that particular word. Inner product similarity means any type of vector operation on two word vectors that results in a scalar value and that value is proportional to the distance between the two vectors. One of such operations is a scalar product of the two vectors that represents the cosine similarities between the vectors. Model training module 308 may generate vector models 310 based on a corpus of text (e.g., annotated data 304 and unannotated data 306) using a modeling tool, such as Word2vec. The flowchart of FIG. 4 further describes how model training module 308 builds and/or updates vector models 310.

In exemplary embodiments, dictionary generator module 312 generates a lexicon, or emotion representative dictionary 314. For example, dictionary generator module 312 may access a corpus of text (e.g., annotated data 304 and unannotated data 306) and vector models 310 to generate and update emotion representative dictionary 314. In an exemplary embodiment, seed words may be extracted from annotated data 304 that include emotion values for a plurality of emotion categories. The seed words may be compared to words of the vector models 310, and emotion associations may be assigned to the words of the vector models 310 based on similarities with the seed words. For example, a given word of the vector models 310 may be compared to the seed words that comprise emotion category associations, and the given word may be assigned to the emotion category of the seed words that are most similar to the given word. The seed words, words of the vector models 310, and corresponding emotion category associations may then be stored as a lexicon, or as emotion representative dictionary 314.

Turn based matrix generator module 316 computes a characteristic matrix for an electronic communication, such as a text string that comprises a turn of a chat messaging application (e.g., entry of a message by a chat user). For example, characteristic tuples may be generated for a subset of words of the text string, and the characteristic tuples may be aggregated to comprise the characteristic matrix. In an exemplary embodiment, the subset of words extracted from the text string may comprise affect bearing words, such as nouns, adverbs, verbs, and adjectives (NAVA). The NAVA words from the text string may be compared to the words of the emotion representative dictionary 314. Based on the comparison, the extracted subset of words can be assigned emotion values for a plurality of emotion categories. The characteristic tuple may comprise an array of the emotion values for the plurality of categories. The characteristic matrix may then comprise an aggregation of the characteristic tuples for the NAVA words of the text string (e.g., an aggregation of 1-dimentional arrays or a 2-dimensional array). In an exemplary embodiment, the emotion categories may comprise happiness, assurance, agreement, courteousness, apologetic, unhappiness, disagreement, and no emotion. Other suitable emotion categories may similarly be implemented.

Figure 4:
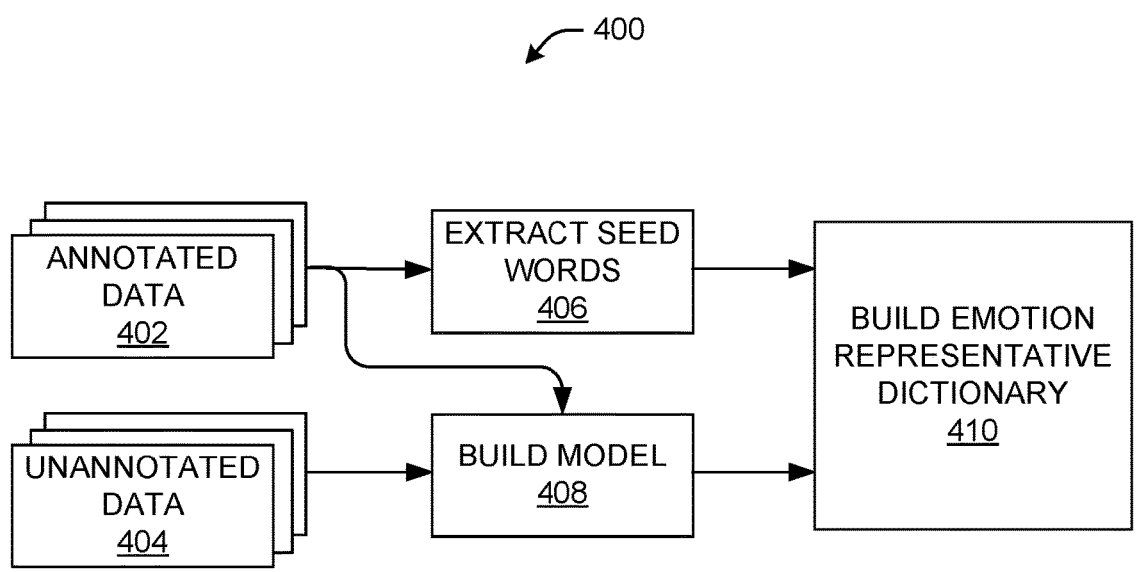
FIG. 4 shows an exemplary flow chart for building an emotion representative dictionary.

FIG. 4 shows an exemplary flowchart for building an emotion representative dictionary. The flowchart of FIG. 4 is illustrated with respect to a content analysis module 110 of FIG. 1 and FIG. 3. In other embodiments, the flowchart can be implemented with any suitable processing node/module. Although FIG. 4 depicts a flow with a particular order for purposes of illustration and discussion, the operations discussed herein are not limited to any particular order or arrangement. One skilled in the art, using the disclosures provided herein, will appreciate that various operations of the flowchart can be omitted, rearranged, combined, and/or adapted in various ways.

Initially, annotated data 402 and unannotated data 404 may be retrieved. In exemplary embodiments, annotated data 402 may comprise electronic communications comprising text strings that have been annotated. Unannotated data 404 may comprise similar electronic communications to annotated data 402, however no annotations are associated with the electronic communications. In exemplary embodiments, annotated data 402 may comprise chat data, such as text strings that represent turns in a chat (e.g., entries of a message by a chat user), where the annotations for a given text string may comprise a characteristic matrix that indicates emotion values across a plurality of emotion categories for a subset of words in the text string. For example, the subset of words may comprise NAVA words for a given text string, and the characteristic matrix may store emotion values for the NAVA words across the plurality of emotion categories. In some embodiments, the emotion categories comprise happiness, assurance, agreement, courteousness, apologetic, unhappiness, disagreement, and no emotion.

In an exemplary embodiment, the annotations may also comprise a characteristic tuple that indicates emotion values for the entire associated text string across a plurality of emotion categories. For example, rather than emotion values for the individual NAVA words of the text string, the annotations may include a single characteristic tuple with emotion values for the entire text string. Annotated data 402 may comprise actual chat entries between at least two users or simulated chat entries between at least two users. The annotation may be manually performed by a human, or may otherwise be provided by any other suitable means.

In exemplary embodiments, unannotated data 404 may comprise raw chat data, such as text strings that represent turns in a chat without additional annotation. Unannotated data 404 may comprise actual chat entries between at least two users or simulated chat entries between at least two users. In some embodiments, annotated data 304 may comprise substantially fewer annotated chat text strings than the number of raw chat text strings comprising unannotated data 404.

At 406, seed words may be extracted from annotated data 402. For example, the seed words may comprise NAVA words from annotated data 402, or text strings that comprise turns of a chat. The seed words may each be associated with a characteristic tuple that stores emotion values for a plurality of emotion categories as an array.

At 408, the unannotated data may be projected to build a vector model. For example, annotated data 402 and unannotated data 404 may comprise an input corpus of text. The words within the input corpus may be represented using the model Word2vec, which is a tool for projecting words into a vector space. Word2vec may take as input a large corpus of text (the annotated data 402 and unannotated data 404) and produce a vector space, typically of several hundred dimensions, with each unique word in the corpus being assigned a corresponding vector in the space. Word vectors are positioned in the vector space such that words that share common contexts in the corpus are located in close proximity to one another in the space.

At 410, the extracted seed words and vector models may be used to build a lexicon or emotion representative dictionary. In an exemplary embodiment, the extracted seed words may be compared to words of the built vector model, and emotion associations may be assigned to the words of the vector model based on similarities with the seed words. The similarity operation includes projecting the words in the same dimension, resulting in a first distributed representation of words, and then computing the distance, such as cosine distance or inner product similarity, between words to determine similarities. Distributed representations of words can be thought of as word vectors, where each word is represented as a vector and each element is the value of different vector dimensions for that particular word. Inner product similarity means any type of vector operation on two word vectors that results in a scalar value and that value is proportional to the distance between the two vectors. One of such operations is a scalar product of the two vectors that represents the cosine similarities between the vectors. For example, a given word of the vector model may be compared to the seed words that comprise emotion category associations, and the given word may be assigned to the emotion category of the seed words that are most similar to the given word (e.g., based on the determined similarities). The seed words, words of the vector models, and corresponding emotion category associations may then be stored as a lexicon, or as an emotion representative dictionary.

Figure 5:
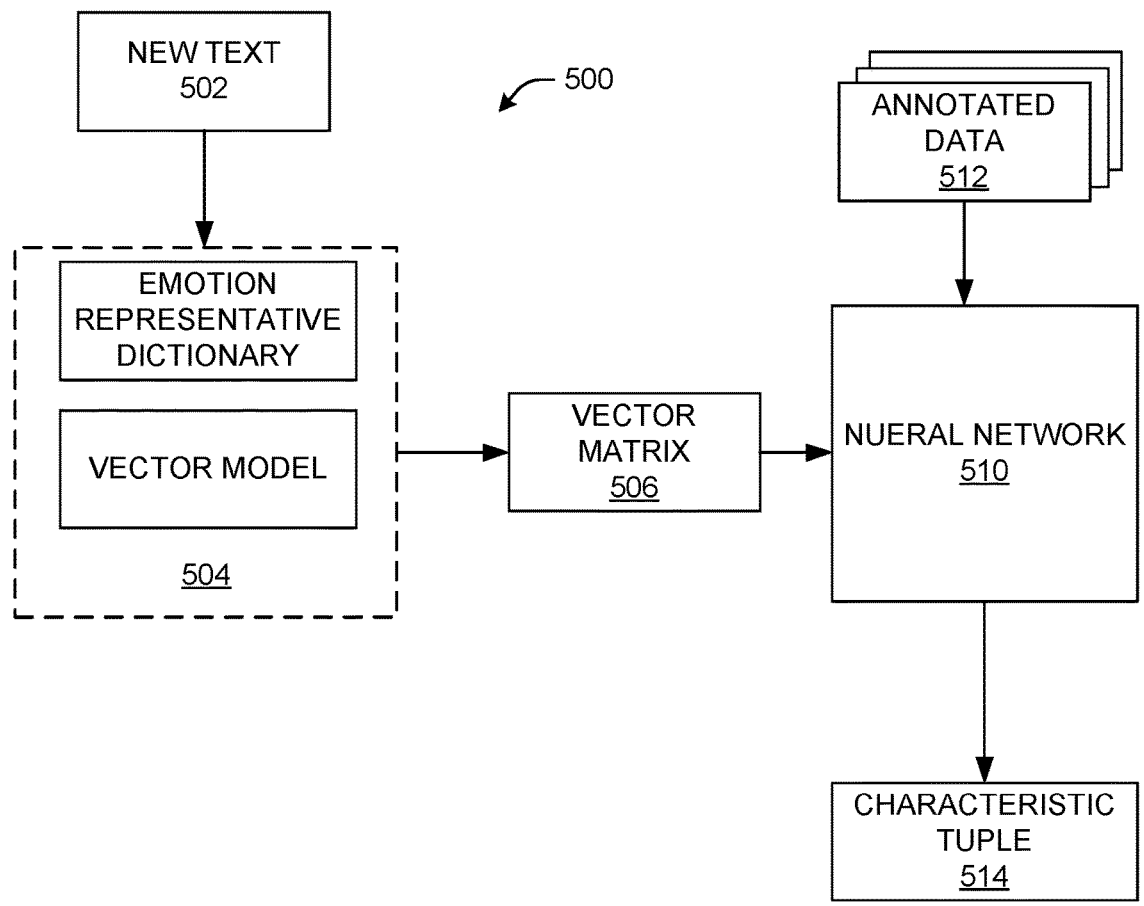
FIG. 5 shows an exemplary flow chart for performing semantic analysis for electronic communication using an emotion representative dictionary and a trained neural network.

FIG. 5 shows an exemplary flowchart for performing semantic analysis for electronic communication using an emotion representative dictionary and a trained neural network. The flowchart of FIG. 5 is illustrated with respect to a content analysis module 110 of FIG. 1 and FIG. 3. In other embodiments, the flowchart can be implemented with any suitable processing node/module. Although FIG. 5 depicts a flow with a particular order for purposes of illustration and discussion, the operations discussed herein are not limited to any particular order or arrangement. One skilled in the art, using the disclosures provided herein, will appreciate that various operations of the flowchart can be omitted, rearranged, combined, and/or adapted in various ways.

Initially, new text 502 comprising a plurality of words can be received. In exemplary embodiments, new text 502 comprises a text string representative of a turn of a chat messaging application (e.g., a message entry of a chat user). In some embodiments, a chat messaging application may comprise a maximum number of words (e.g., 196 words or the like) and new text 502 may be limited to the maximum number of words for the chat messaging application. Example new text strings may comprise "You're the fifth person I've talked to today, so I hope you can help me" or "I already tried that and it didn't work" or "thanks for the assistance, this stuff always confuses me."

New text 502 may be analyzed, for example by a content processing module 504. The content processing module 504 may include an emotion representative dictionary and a vector model for a corpus of text. The emotion representative dictionary and vector model may be built based on a flowchart similar to the flowchart of FIG. 4. New text 502 may be comparted to the words of the emotion representative dictionary to generate vector matrix 506.

In exemplary embodiments, a subset of words may be extracted from new text 502, such as the NAVA words of the new text. The subset of words of new text 502 may then be compared with the words of the representative emotion dictionary to determine characteristic tuples for the subset of words. For example, based on similarities with the words of the representative emotion dictionary, emotion values may be assigned to the subset of words across a plurality of emotion categories. In some embodiments, the emotion categories comprise happiness, assurance, agreement, courteousness, apologetic, unhappiness, disagreement, and no emotion.

In exemplary embodiments, a characteristic tuple comprises a 1-dimensional array of the emotion values for these emotion categories for a given word of the subset of words of new text 502. For example, a pointwise mutual information (PMI) value may be determined for the given word with all or a portion of the words in the emotion representative dictionary. PMI is a measure of association between two entities. More specifically, it signifies the amount of information that can be obtained/inferred/predicted about one entity, if we already have the knowledge of the other one. For example, for the given word w a PMI score may be computed for each emotion category $e_i$. Given that there are $N_i$ words in emotion category $e_i$ in the emotion representative dictionary represented by set $S_i$. Let PMI (w, $w_i$) represent the PMI between the word "w" and the word "$w_i$," corresponding to emotion category $e_i$ in the emotion representative dictionary where the subscript i represent emotion category "i" and $w_i$ is a member of $S_i$. The emotion representative characteristic tuple (ERS) for a given word w has components $e_1$, $e_2$, $e_3$, . . . , $e_k$, where k is the number of emotion categories in the set. Accordingly for a given word "w," a characteristic tuple for a given emotion category "i" is calculated using:

$$ERS(w, e_i) = \sqrt[N_i]{\prod_{j=1}^{N_i} PMI(w, w_j)}$$

In this example, $w_i$ is a member of the representative set $S_i$ belonging to emotion category "i". In an exemplary embodiment, to obtain the emotion score of a given word (with respect to a particular emotion category), the geometric mean is calculated of the PMIs of the given word with all representative words in the emotion category within the emotion representative dictionary. This calculation can be repeated for each emotion category to generate the 1-dimensional array of emotion values that comprise the characteristic tuple for the given word. Other suitable similarity measures may be implemented without deviating from the scope of this disclosure.

Once the characteristic tuples for the subset of words extracted from new text 502 (e.g., NAVA words) are generated, the characteristic tuples are aggregated to generate vector matrix 506 for new text 502. Vector matrix 506 may be a 2-dimensional array comprising an array of the 1-dimentional characteristic tuple arrays generated for the subset of words.

In an exemplary embodiment, vector matrix 506 is input into a trained neural network 510. For example, trained neural network 510 may be trained using annotated data 512. In exemplary embodiments, annotated data 512 may comprise chat data, such as text strings that represent turns in a chat (e.g., entries of a message by a chat user), where the annotations for one of the text strings may comprise a characteristic matrix that indicates emotion values across a plurality of emotion categories for a subset of words in the one text string. For example, the subset of words may comprise NAVA words for the one text string, and the characteristic matrix may store emotion values for the NAVA words across the plurality of emotion categories.

In an exemplary embodiment, the annotations for the one text string may also comprise a characteristic tuple that indicates emotion values for the entire text string across a plurality of emotion categories. For example, rather than emotion values for the individual NAVA words of the one text string, the annotations may include a single characteristic tuple with emotion values for the entire text string.

Trained neural network 510 may be trained using annotated data 512 such that the trained neural network receives input that comprises a characteristic matrix and outputs a characteristic tuple. For example, trained neural network 510 may be a 3-level neural network with an input layer, hidden layer, and output layer. The input layer may be 196 units (e.g., a maximum number of words for a chat entry), or a characteristic matrix of 196×8. In some embodiments, zero-padding is used for input smaller than 196 units. The hidden layer may comprise 200 units, or any other suitable value. The output layer may be 8 units, or a characteristic tuple for the chat entry associated with the input characteristic matrix (e.g., new text 502). Any suitable learning rate may be implemented (e.g., 0.001).

In an exemplary embodiment, trained neural network 510 receives as input a characteristic matrix generated for new text 502 and outputs characteristic tuple 514 representative of the emotion for the entire text string of new text 502. For example, characteristic tuple 514 may comprise emotion values for the emotion categories that represent the emotion of the user that generated new text 502.

In some embodiments, new text 502 may be received in real-time at each entry of a chat message from a user of a chat messaging application. Based on the received chat message, a characteristic matrix may be generated and input into the trained neural network such that a characteristic tuple is generated that represents the emotion of the user that typed the chat message, where each of these functions may be performed in real-time. Accordingly, real-time emotion identification of turn based chat data may be realized by use of the emotion representative dictionary and trained neural network.

Figure 6:
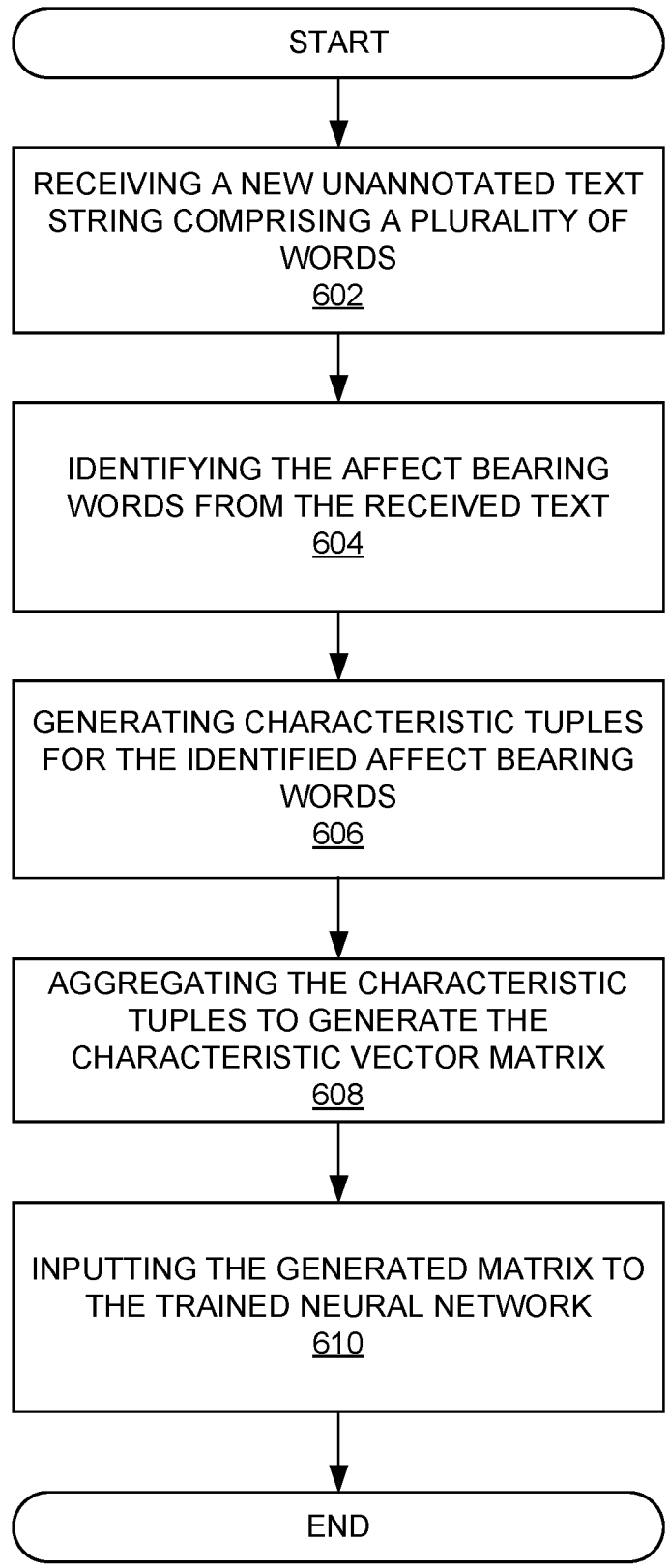
FIG. 6 shows an exemplary method for generating a characteristic matrix for electronic communication.

FIG. 6 shows an exemplary method for performing semantic analysis of electronic communication using a lexicon. The method of FIG. 6 is described with respect to FIG. 1, how any other suitable system configuration can be implemented. For example, the method can be implemented with any suitable processing node/module. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 602, an unannotated text string may be received comprising a plurality of words from a user. For example, an unannotated text string comprising an electronic communication, such as a chat message comprising a plurality of words from a turn based chat application, may be received from a user. In various examples, the unannotated text string may comprise complete sentences, sentence fragments, and any other suitable language commonly used when communicating using a turn based chat application. The unannotated text string may be received in real-time, that is in real-time relative to the chat entry from the user.

At 604, the affect bearing words may be extracted or identified from the received text. For example, the NAVA words may be extracted or identified from the received unannotated text (e.g., chat message). At 606, characteristic tuples may be generated for the identified or extracted affect bearing words. For example, characteristic tuples may be generated for the NAVA words of the received unannotated text (e.g., chat message). As described herein, characteristic tuples may be generated for the affect bearing words based on similarity calculations between the affecting bearing words and words of an emotion representative dictionary or lexicon. In an exemplary embodiment, the characteristic tuple may comprise a 1-dimensional array of emotion values for a plurality of emotion categories. In some embodiments, the emotion categories comprise happiness, assurance, agreement, courteousness, apologetic, unhappiness, disagreement, and no emotion.

At 608, the characteristic tuples may be aggregated to generate a characteristic matrix. For example, the generated characteristic matrix may comprise an aggregation of the characteristic tuples for the NAVA words of the text string (e.g., an aggregation of 1-dimentional arrays or a 2-dimensional array). At step 610, the characteristic matrix may be input into a trained neural network.

Figure 7:
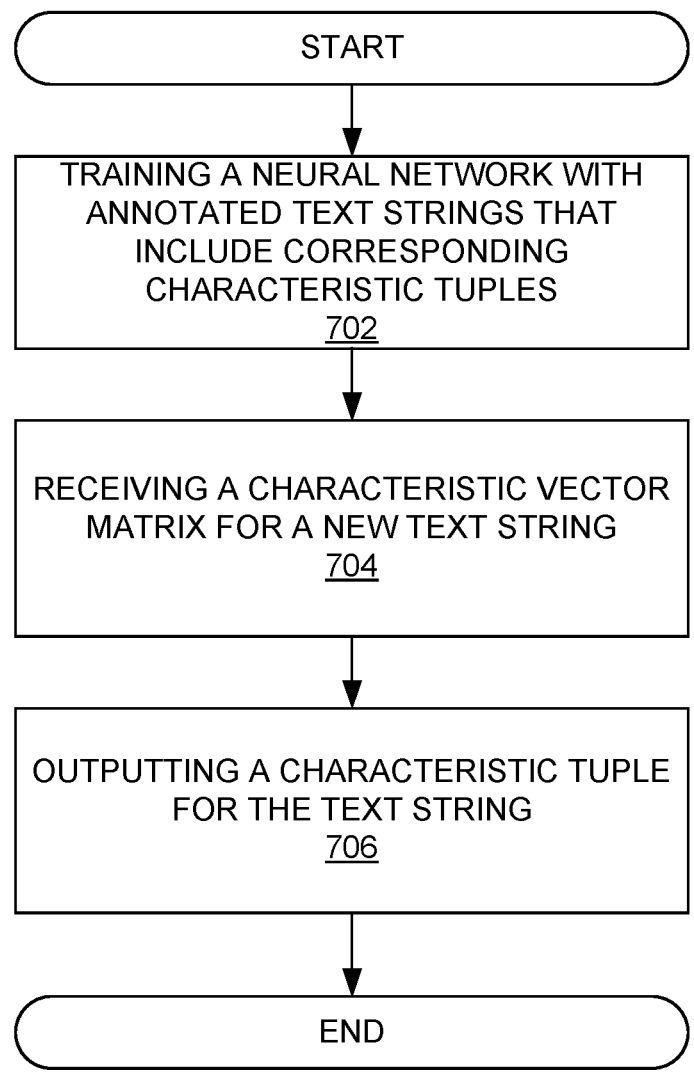
FIG. 7 shows an exemplary method for determining a characteristic tuple for the u electronic communication based on the characteristic matrix and a trained neural network.

FIG. 7 shows an exemplary method for performing semantic analysis of electronic communication using a lexicon. The method of FIG. 7 is described with respect to FIG. 1, how any other suitable system configuration can be implemented. For example, the method can be implemented with any suitable processing node/module. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 702, a neural network model may be trained with a plurality of annotated text strings, the annotations comprising characteristic tuples that indicate characteristics for the text strings. For example, a neural network model, such as a 3-level neural network with a hidden layer, or any other suitable neural network, may be trained with a plurality of annotated text strings, as further described herein.

At 704, a characteristic matrix may be received at the trained neural network. For example, a characteristic matrix associated with an unannotated text string (e.g., chat data) may be generated and input into the trained neural network, for instance by performing the steps of the method of FIG. 6. At 706, a characteristic tuple that indicates a characteristic for the unannotated text string may be received as output from the trained neural network. For example, the trained neural network may receive as input the characteristic matrix that is associated with the unannotated text string (e.g., chat message) and output a characteristic tuple for the received text string (e.g., chat message) that indicates values for emotion categories for the unannotated text string, as further described herein.

Numerous advantages may be envisioned by the disclosed systems and methods. For example, real-time identification of the emotion represented in electronic communication, such as the emotion of a chat application user, may be identified by an automated system. This real-time identification may achieve reliable and accurate emotion identification based on the parameters for the automation. The neural network architecture and associated methods and systems disclosed herein perform better than other complex feature engineering based methods without neural networks. In particular, a simplistic array based technique is implemented to produce emotion prediction results with consistency. In addition, a learning based neural network is leveraged to allow the techniques to continue perfecting the emotion prediction. Thus, the simplistic and effective techniques described herein improve upon existing automation attempts to identify emotion in electronic communication.

In some implementations, the real-time identification of emotion from a chat application user can be effective in providing timely and practical information. For example, a customer service representative chatting with a customer or potential customer over a chat application can identify the real-time emotions of the customer or potential customer and tailor chat messages or other actions, such as sales actions, return actions, or refund actions for a previous sale of a product or service, to the identified emotions. Absent reliable and accurate emotion identification by automated means, such customer service is highly dependent on a customer service representative's ability to identify emotion in a chat. Thus, the automated means for identifying such emotions improves the reliability and consistency of a customer service division. Other applications of the described techniques will be evident to those having ordinary skill in the art in light of this disclosure.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for performing semantic analysis for electronic communication using a lexicon, the method comprising:
    training a neural network model with a plurality of annotated text strings, the annotations comprising characteristic tuples that indicate characteristics for the text strings;
    receiving an unannotated text string comprising a plurality of words from a user;
    generating a characteristic matrix for the received text string using a lexicon;
    inputting the determined characteristic matrix to the trained neural network; and
    receiving as output from the trained neural network a characteristic tuple that indicates a characteristic for the received text string.

2. The method of claim 1, wherein the annotated text strings and unannotated text string comprise chat text strings.

3. The method of claim 2, wherein the chat text strings are based on chats between a service provider and a user or simulated chats between a service provider and a user.

4. The method of claim 2, wherein one of the annotated text strings comprises a plurality of characteristic tuples that correspond to predetermined affect bearing words within the one annotated text string.

5. The method of claim 4, wherein the characteristic matrix comprises an aggregate of characteristic tuples that correspond to predetermined affect bearing words within the received text string.

6. The method of claim 5, wherein the characteristic tuples comprise vectors that indicate numerical values for a plurality of emotion categories for the affect bearing word associated with each characteristic tuple.

7. The method of claim 6, wherein determining a characteristic matrix for the received text string comprises:
    identifying the affect bearing words within the received text string;
    generating, for each identified affect bearing words, a characteristic tuple by determining numeric values for the emotion categories for the associated affect bearing words based on the lexicon, wherein the lexicon comprises an emotion representative dictionary; and
    aggregating the generated characteristic tuples to generate the characteristic matrix.

8. The method of claim 7, wherein the numeric values for the emotion categories for the associated affect bearing words comprise an average of a pointwise mutual information value for the affect bearing words relative to the words in the emotion representative dictionary.

9. The method of claim 7, further comprising building the emotion representative dictionary based on the annotated text strings, characteristic tuples corresponding to the annotated text strings, and a plurality of predetermined unannotated text strings.

10. The method of claim 9, wherein building the emotion representative dictionary comprises:
    identifying seed words that comprise numerical values for the emotion categories from the annotated text strings;
    identifying affect bearing words in the predetermined text strings; and
    computing, for each identified affecting bearing word in the predetermined text strings, numerical values for the emotion categories based on comparisons to the seed words; and
    storing the seeds words and identified affect bearings words along with the corresponding numerical values for the emotion categories for these words.

11. The method of claim 10, wherein identifying the affect bearing words of the predetermined text strings further comprises identifying nouns, adjectives, verbs, and adverbs as the affecting bearing words.

12. The method of claim 11, wherein comparing the affect bearing words to the seed words comprises:
   projecting the identified affect bearing words and the seed words in a same dimension; and
   computing a distance between the identified affect bearing words and the seed words in the projected dimension.

13. The method of claim 6, wherein the emotion categories comprise happiness, assurance, agreement, courteousness, apologetic, unhappiness, disagreement, and no emotion.

14. A system for performing semantic analysis for electronic communication using a lexicon, the system comprising:
   a neural network model comprising a processor that is trained with a plurality of annotated text strings, the annotations comprising characteristic tuples that indicate characteristics for the text strings; and
   a content analysis module comprising a processor that is configured to:
      receive an unannotated text string comprising a plurality of words from a user;
      generate a characteristic matrix for the received text string using a lexicon; and
      input the determined characteristic matrix to the trained neural network, wherein a characteristic tuple that indicates a characteristic for the received text string is received as output from the trained neural network.

15. The system of claim 14, wherein the annotated text strings and unannotated text string comprise chat text strings.

16. The system of claim 15, wherein the characteristic matrix comprises an aggregate of characteristic tuples that correspond to predetermined affect bearing words within the received text string.

17. The system of claim 16, wherein the characteristic tuples comprise vectors that indicate numerical values for a plurality of emotion categories for the affect bearing word associated with each characteristic tuple.

18. The system of claim 17, wherein determining a characteristic matrix for the received text string comprises:
   identifying the affect bearing words within the received text string;
   generating, for each identified affect bearing words, a characteristic tuple by determining numeric values for the emotion categories for the associated affect bearing words based on the lexicon, wherein the lexicon comprises an emotion representative dictionary; and
   aggregating the generated characteristic tuples to generate the characteristic matrix.

19. The system of claim 18, wherein the content analysis module is further configured to build the emotion representative dictionary based on the annotated text strings, characteristic tuples corresponding to the annotated text strings, and a plurality of predetermined unannotated text strings, the building further comprising:
   identifying seed words that comprise numerical values for the emotion categories from the annotated text strings;
   identifying affect bearing words in the predetermined text strings;
   computing, for each identified affecting bearing word in the predetermined text strings, numerical values for the emotion categories based on comparisons to the seed words; and
   storing the seeds words and identified affect bearings words along with the corresponding numerical values for the emotion categories for these words to build the emotion representative dictionary.

20. The system of claim 19, wherein comparing the affect bearing words to the generated seed words comprises:
   projecting the identified affect bearing words and the seed words in a same dimension; and
   computing a distance between the identified affect bearing words and the seed words in the projected dimension.

* * * * *